US012759266B2

(12) United States Patent
Murphy La Rotta

(10) Patent No.: US 12,759,266 B2
(45) Date of Patent: Oct. 13, 2026

(54) CURVED ANTI-BALLISTIC GLASS ARMOR WITH ARGON CHAMBER FOR CAR WINDOWS AND MANUFACTURING METHOD

(71) Applicant: John Frederick Murphy La Rotta, Bogota (CO)

(72) Inventor: John Frederick Murphy La Rotta, Bogota (CO)

( * ) Notice: Subject to any disclaimer, the term of this patent is extended or adjusted under 35 U.S.C. 154(b) by 164 days.

(21) Appl. No.: 18/506,156

(22) Filed: Nov. 10, 2023

(65) Prior Publication Data

US 2025/0153454 A1 May 15, 2025

(51) Int. Cl.
*B32B 17/10* (2006.01)
*B32B 1/00* (2006.01)
(Continued)

(52) U.S. Cl.
CPC .......... *B32B 17/10055* (2013.01); *B32B 1/00* (2013.01); *B32B 3/06* (2013.01); *B32B 3/266* (2013.01); *B32B 7/12* (2013.01); *B32B 17/10064* (2013.01); *B32B 27/08* (2013.01); *B32B 27/365* (2013.01);
(Continued)

(58) Field of Classification Search
CPC . F41H 5/04; F41H 5/0407; F41H 5/26; F41H 5/263; B32B 17/10–1099; E06B 3/663–6675; E06B 7/23; E06B 7/2314; C09J 2301/124
See application file for complete search history.

(56) References Cited

U.S. PATENT DOCUMENTS 4,312,903 A * 1/1982 Molari, Jr. ................ E06B 5/10 428/447
4,316,404 A * 2/1982 Medlin .................. F41H 7/044 52/171.2
(Continued)

FOREIGN PATENT DOCUMENTS

CO 40892 12/2020
EP 0109566 A2 * 5/1984 ........... F41H 5/0407
(Continued)

OTHER PUBLICATIONS

Machine translation of EP 109566 A2.*
Machine translation of EP 3309500 A1.*
Machine translation of FR 2507238 A1.*

*Primary Examiner* — Z. Jim Yang
(74) *Attorney, Agent, or Firm* — Patenting Consulting Group; Roberto J Rios

(57) ABSTRACT

The present invention belongs to the field of shielding mechanics for personal protective equipment and more specifically relates to the external shielding of a transparent glass or armor curved and laminated on its periphery, which has an argon chamber for automobile windows that does not requires modification of door or window frames; since it proposes a new solution with a reinforced flange that is established in the armor and not in the frame of the vehicle, made up of a perimeter steel flange, glass of different sizes, reinforcing polycarbonates and an argon chamber that makes it light, thin, which does not fog up due to temperature changes and blocks external bullet impacts but is permissive to the passage of bullets towards the outside of the vehicle due to internal impact.

7 Claims, 4 Drawing Sheets

(51) Int. Cl.

| | |
|---|---|
| ***B32B 3/06*** | (2006.01) |
| ***B32B 3/26*** | (2006.01) |
| ***B32B 7/12*** | (2006.01) |
| ***B32B 27/08*** | (2006.01) |
| ***B32B 27/36*** | (2006.01) |
| ***B32B 37/10*** | (2006.01) |
| ***B32B 38/00*** | (2006.01) |
| ***B32B 38/10*** | (2006.01) |
| ***B32B 38/14*** | (2006.01) |
| ***F41H 5/04*** | (2006.01) |

(52) U.S. Cl.

CPC ...... *B32B 37/1018* (2013.01); *B32B 38/0004* (2013.01); *B32B 38/0036* (2013.01); *B32B 38/10* (2013.01); *B32B 38/14* (2013.01); *F41H 5/0407* (2013.01); *B32B 2038/0064* (2013.01); *B32B 2250/04* (2013.01); *B32B 2307/718* (2013.01); *B32B 2307/7376* (2023.05); *B32B 2309/02* (2013.01); *B32B 2309/68* (2013.01); *B32B 2369/00* (2013.01); *B32B 2375/00* (2013.01); *B32B 2571/02* (2013.01); *B32B 2605/00* (2013.01)

(56) References Cited

U.S. PATENT DOCUMENTS

| | | | | | |
|---|---|---|---|---|---|
| 4,333,282 | A * | 6/1982 | Medlin | B60P 3/03 | 52/204.597 |
| 6,708,595 | B1 * | 3/2004 | Chaussade | B32B 17/10293 | 89/36.02 |
| 2003/0192426 | A1 * | 10/2003 | Peretz | F41H 5/0407 | 89/36.02 |
| 2007/0218262 | A1 * | 9/2007 | Degand | C03C 17/34 | 428/215 |
| 2008/0032104 | A1 * | 2/2008 | Mannheim Astete | F41H 5/0407 | 428/433 |
| 2010/0300276 | A1 * | 12/2010 | Justamon | B32B 17/10293 | 89/905 |
| 2011/0072961 | A1 * | 3/2011 | Jungkuist | F41H 5/0407 | 89/905 |
| 2012/0269995 | A1 * | 10/2012 | Leighton | B32B 27/08 | 428/34 |
| 2013/0171398 | A1 | 7/2013 | Stranner | | |
| 2014/0065330 | A1 * | 3/2014 | Calomfirescu | B32B 17/10064 | 428/34 |
| 2018/0051189 | A1 * | 2/2018 | Cho | B32B 7/12 | |
| 2018/0117881 | A1 * | 5/2018 | Pyles | B32B 7/12 | |
| 2018/0156578 | A1 * | 6/2018 | Trudeau | B32B 37/12 | |
| 2019/0291387 | A1 * | 9/2019 | Neander | E06B 3/663 | |
| 2020/0331237 | A1 * | 10/2020 | Knuth | E06B 3/66314 | |
| 2020/0378727 | A1 * | 12/2020 | Puckett | F41H 5/0407 | |
| 2020/0408032 | A1 * | 12/2020 | Schlögl | E06B 3/66333 | |
| 2021/0190460 | A1 * | 6/2021 | Gamboa | B32B 17/10045 | |

FOREIGN PATENT DOCUMENTS

| | | | | |
|---|---|---|---|---|
| EP | 3309500 | A1 * | 4/2018 | F41H 5/263 |
| FR | 2507238 | A1 * | 12/1982 | F41H 5/0407 |
| WO | WO-9322136 | A1 * | 11/1993 | B32B 27/06 |
| WO | WO-2011138725 | A2 * | 11/2011 | B32B 17/1077 |
| WO | WO-2025023817 | A1 * | 1/2025 | B32B 17/10 |

* cited by examiner

CURVED ANTI-BALLISTIC GLASS ARMOR WITH ARGON CHAMBER FOR CAR WINDOWS AND MANUFACTURING METHOD

FIELD OF THE INVENTION

The present invention belongs to the field of shielding mechanics for personal protective equipment and more specifically relates to the external shielding of a transparent glass or armor curved and laminated on its periphery, which has an argon chamber for car windows that does not require modification of the door or window frames; since it proposes a new solution with a reinforced flange that is established in the glass armor and not in the frame of the vehicle, made up of a perimeter steel flange, glass of different sizes, reinforcing polycarbonates and an argon chamber that makes it lightweight, thin, with physical resistance to temperature changes, that does not fog up and blocks external bullet impacts and is permissive to the passage of bullets towards the outside of the vehicle due to internal impact.

BACKGROUND OF THE INVENTION

In the state of the art, armored or antiballistic glasses are known that propose a solution with layers of glass, polycarbonate sheets or acrylic sheets adhered with polymers to create transparent surfaces resistant to bullet impacts; As an example, there is the patent WO2012038095A1 "BULLETPROOF GLASS PANE HAVING EDGE REINFORCEMENT" from the applicants ISOCLIMA GMBH; STRANNER, SIEGFRIED with publication date Mar. 29, 2012 and also published in the United States as US 2013/0171398 on Jul. 4, 2013. Said background does not have any type of argon chamber, since it is the simple agglomeration of layers of components that form glass.

The inventor of the present application has a patent granted in Colombia called "AIR CHAMBER GLASS WITH FLASH" that has certificate 40892, published on Jan. 29, 2021. This background describes the configuration of an armored glass for automobiles, but with the weight deficiencies in its final product that damages the OEM car window motors, it has a thickness greater than the proposal of the new invention because it incorporates twice as much glass to which the polypropylene adheres and presents problems of visibility or transparency of the window when there are changes in temperature that affect its air chamber.

Furthermore, the background is a glass solution that, due to its polyurethane coating structure that is laminated together with the glass, which causes the polyurethane film to detach from the glass over time due to its expansion and dilation, which is different to the expansion of the glass and cannot be replaced; and its air chamber proposal is not permissive with the impacts of 9 mm bullets that can be generated from inside the car so that the projectiles come out.

In the state of the art, there is no curved transparent glass or armor that incorporates an argon gas in an internal chamber nor a known manufacturing method. No known curved ballistic glass solution protects from external impacts so that bullets enter the interior of the vehicle and at the same time allows internal impacts for 9 mm bullets to exit the vehicle to defend against external aggressor and is also resistant to changes in ambient temperature so as not to lose visibility due to freezing, since the melting point of argon is −189.4° C.

SUMMARY OF THE INVENTION

The invention proposes an antiballistic curved glass armor with an argon chamber for automobile windows and a manufacturing method; where the proposed glass armor has a light weight so as not to damage the OEM electric glass motors of automobiles, allows the return of light bullet impacts such as those from 9 mm projectiles from the inside to the outside of the vehicle and does not present changes in visibility due to of changes in ambient temperature.

The new invention of anti-ballistic curved glass armor with argon chamber for car windows and manufacturing method proposes a transparent armor with a weight between 23 kg-24 kg/m2 level IIIA (811.3 oz-846.5 oz/10.7/ft2 level IIIA) that allows the OEM motor to lower and raise the vehicle windows; whose new anti-ballistic curved glass armor with argon chamber for car windows is 40% lighter than traditional ballistic glass which has a weight of 40 kg/m2 level IIIA. (1410.9 oz/ft2 level IIIA). This weight reduction is obtained by combining layers of glass with polycarbon films that form an internal chamber in which argon gas is deposited, where half as much glass and twice as much polycarbonate are used than that used in traditional ballistic glass, where traditional ballistic glass has layers of polycarbonate covering the entire glass.

Traditional ballistic glass (GCP) delaminates because the polycarbonate is bonded directly to the entire inner glass layer. Because glass and polycarbonate expand and contract at different rates, the adhesive properties of the polyurethane interlayer give way and the glass and polycarbonate delaminates over time. With this invention and manufacturing process, the polycarbonate and glass never touch in their central part, they are fixed around their perimeter edges allowing the glass and polycarbonate to expand and contract at their own pace without delaminating and also Minimizes loss of transparency between layers over time.

With this new invention, the thickness of the curved anti-ballistic glass armor is reduced by 22% compared to that of traditional armored glass, since the current transparent armor has a thickness of 19 mm (0.74 in.) and the new Armor invention is only 15 mm (0.59 in.) maximum thickness, with an argon gas chamber between the glass and polycarbonate to prevent fogging in cold climates. The anti-fogging solution due to change in ambient temperature with argon gas has never been presented in a curved anti-ballistic glass and is a solution to the problem of temperature change in the early hours of the morning or in winter.

Traditional NIJ IIIA level curved ballistic glass (GCP) does not have the ability to return fire, meaning bullet impacts will bounce off the vehicle, but if a shot is fired from inside the vehicle, the shot will It will also bounce inside the same vehicle; so that the bullets do not enter, but they do not leave either. In this invention, due to this unique design in the structure of its layers and coatings, it allows 9 mm caliber bullets fired from inside the vehicle to completely penetrate the glass or completely pass through it to the outside, so the user and the occupant of the vehicle can fire 9 mm caliber bullets through the ballistic glass window from the inside out without causing them to ricochet into the interior of the vehicle; At the same time, the user and occupant of the vehicle is protected from external bullets that will not be able to pass through the ballistic glass from the outside to the inside.

The manufacturing method of the new invention proposes that the layers between glass and polycarbonate are not laminated together on their entire surface, that is, they are laminated on their periphery and not on the entire surface;

allowing clear glass or polycarbonate to be repaired when broken, whether the glass is broken or the polycarbonate is broken. Traditional ballistic glass must be discarded completely when the glass or polycarbonate is damaged due to being laminated together across its entire surface; but the new invention does not have all the layers laminated together, since the new product can be repaired because the polycarbonate can be easily separated from the glass and the layers of damaged pieces can be replaced by separating them at their joining periphery.

BRIEF DESCRIPTION OF THE DRAWINGS

The attached figures illustrate the scope of the invention within the following proposal for air chamber glass with a flange.

DETAILED DESCRIPTION OF THE INVENTION

Figure 1:
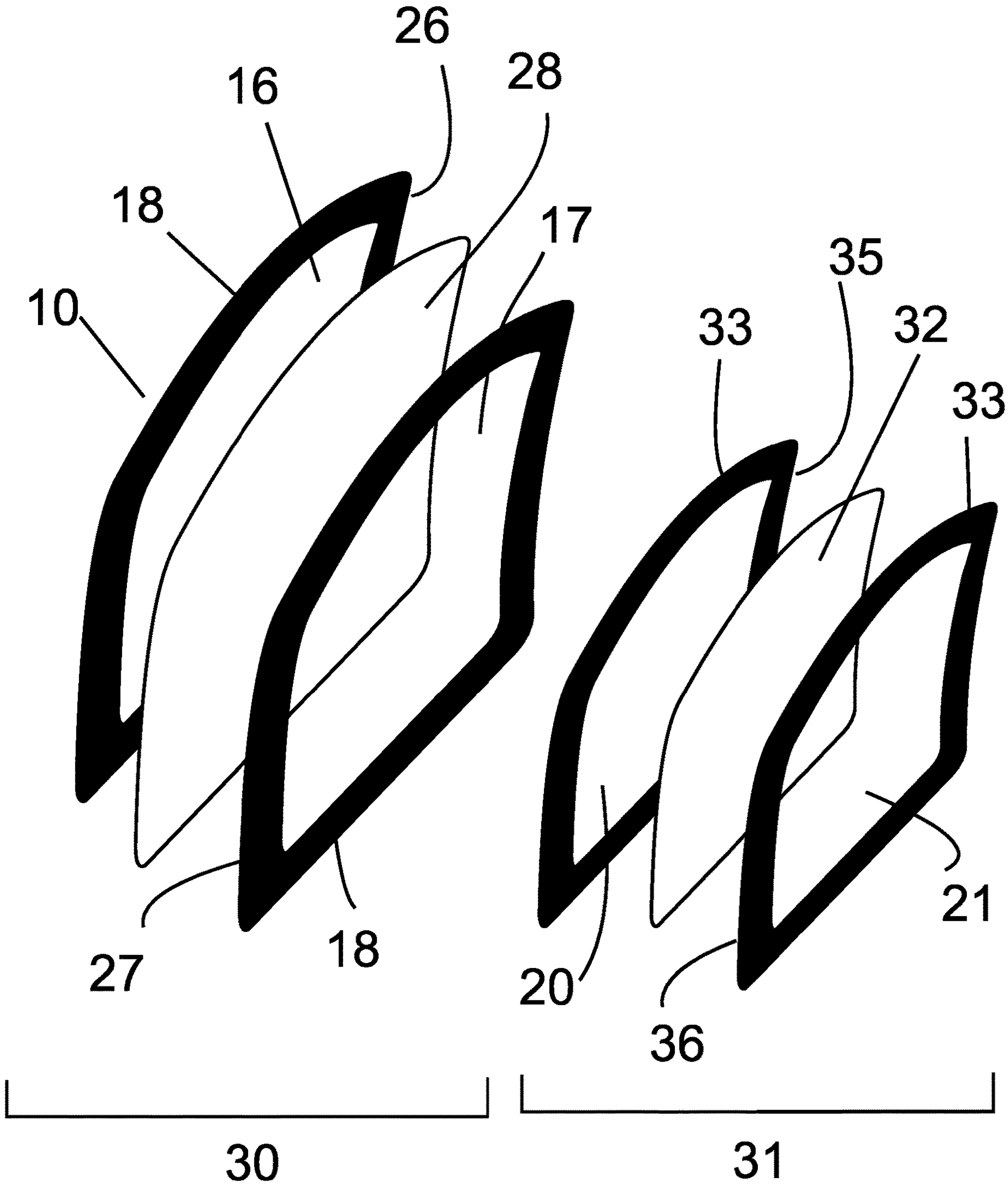
FIG. 1 shows the layers of curved anti-ballistic glass armor with argon chamber for car windows.
Figure 2:
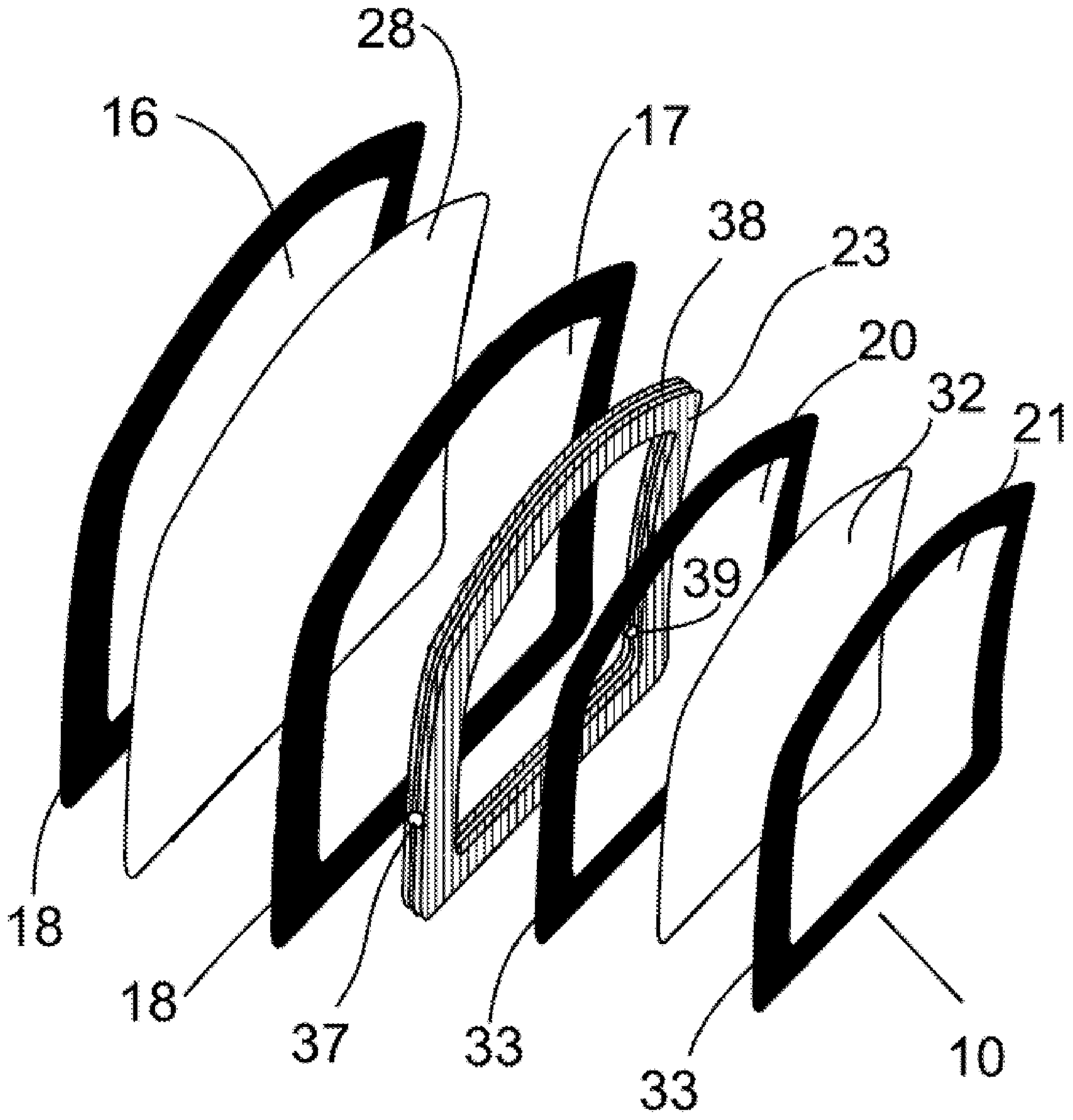
FIG. 2 shows the layers of the curved anti-ballistic glass armor, the reinforcing flange that borders the outside of the glass and the urethane seal with perforation to introduce argon into the formed chamber.
Figure 3:
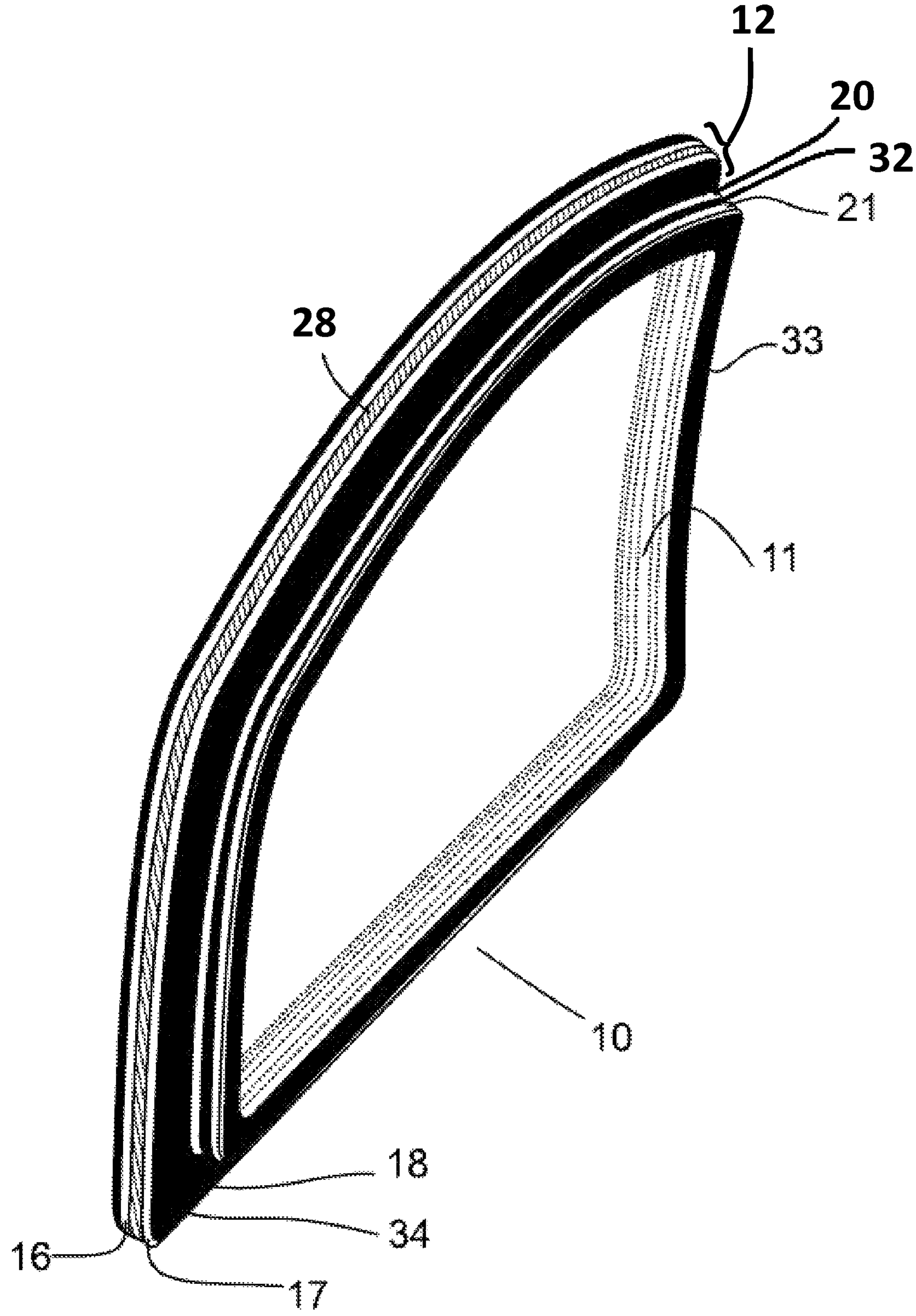
FIG. 3 shows a view of the external appearance of the anti-ballistic curved glass armor with its flange for insertion into a traditional automobile window frame.
Figure 4:
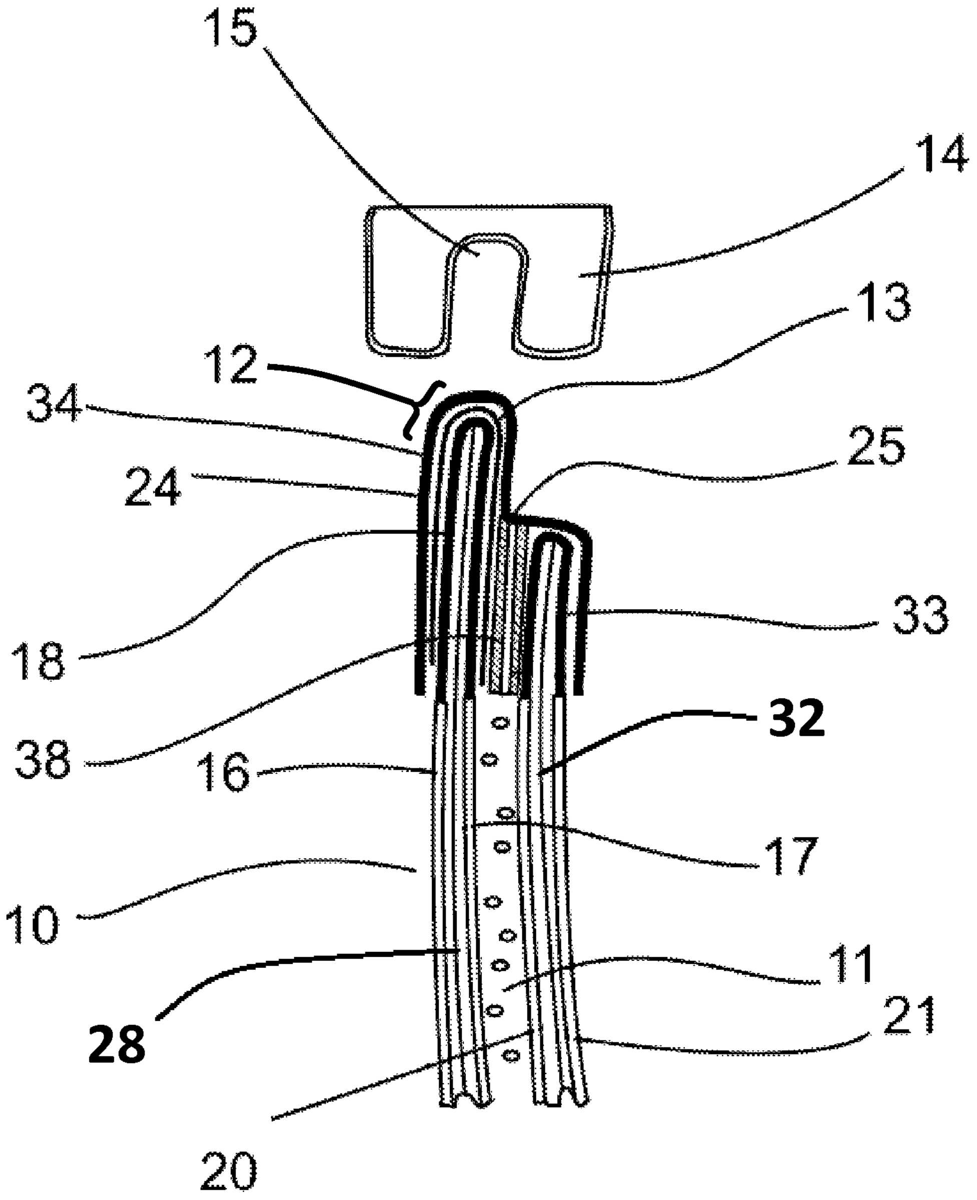
FIG. 4 shows a sectional view of the antiballistic curved glass armor with the joined layers and the argon chamber space.

The antiballistic curved glass armor (10) comprises an external section (30) with two glass sheets (16), (17) of equal size, laminated with a ionoplast layer (28) on its external perimeter section (18) and joined to a smaller internal section (31) that has two polycarbonate sheets (20), (21) of equal size, laminated with a polyurethane layer (32) in its internal perimeter section (33). The union between the external section (30) and the internal section (31) forms an argon chamber (11) and at the top there is a flange (12) formed by the difference in size between the glass sheets (16), (17) of the external section (30) and the polycarbonate sheets (20), (21) of the internal section (31).

The flange (12) compensates for the weak edge of traditional 8 mm armored glass and withstands the impacts of projectiles fired from firearms from the outside of the vehicle and is a lightweight solution for attachment to a traditional vehicle window. For the perimeter reinforcement, the entire perimeter section (34) including the flange (12) is laminated with a steel metal strip (13) from 1.5 mm to 2 mm thick; so that the flange (12) laminated with steel metal strip (13) enters the cavity (15) of the original frames (14) of the vehicle without the need to make extensions to the original frame (14).

The antiballistic curved glass armor (10) is composed of a perimeter section (34) formed by the external perimeter section (18) and the internal perimeter section (33) where the lamination of the sheets is carried out together: lamination of the external glass sheet (16), lamination of the internal glass sheet (17), lamination of the external polycarbonate sheet (20) and lamination of the smaller internal polycarbonate sheet (21), without laminating the entire surface of the layers, but only in said perimeter section (34). This perimeter section (34) is painted with the traditional black color and has adhesive (25) to give an external appearance that simulates a common vehicle window glass.

The first external glass sheet (16) is joined to the internal glass sheet (17) with a ionoplast layer (28) in between them and makes up the largest area of the antiballistic curved glass armor (10); where the internal face (26) of the first external glass sheet (16) is laminated with the external face of the ionoplast layer (28) on the external perimeter section (18), and in turn, the external face (27) The internal glass sheet (17) is laminated to the inner face of the ionoplast layer (28) on the external perimeter section (18).

The first external polycarbonate sheet (20) is joined to the internal polycarbonate sheet (21) with a polyurethane layer (32) in the middle of them and makes up the smaller area of the curved anti-ballistic glass armor (10); where the internal face (35) of the external polycarbonate sheet (20) is laminated with the external face of the polyurethane layer (32) in the internal perimeter section (33), and in turn, the external face (36) of the internal polycarbonate sheet (21) is laminated to the inner face of the polyurethane layer layer (32) in the inner perimeter section (33).

The first external glass sheet (16) joined to the internal glass sheet (17) has the same curved path and the same size as an original frame (14). The flange (12) laminated with metal strip (13) that enters the cavity (15) of the original frames (14) of a vehicle is formed by a projection (24), whose projection (24) protrudes a defined distance from the edge of the facing glass sheets (16) and (17) and the edge of smaller facing sheets (20) and (21) made of thermoplastic material; where the facing glass sheets (16) and (17) are distanced with double-sided tape (38) from the facing polycarbonate sheets (20) and (21), but joined with urethane (23) in their internal perimeter section (33).

Said internal perimeter section (33) has a perforation region (37) through which the argon gas is introduced into the argon chamber (11) at the time of its manufacture and a perforation region (39) through which the air is expelled. the argon chamber (11); where said perforation regions (37), (39) are sealed when the argon chamber (11) only houses argon gas.

So that the antiballistic curved glass armor (10) on its external part has the flange (12) laminated with a metal strip (13), on the periphery there is the laminate of the layers and the chamber seal with urethane (27), and in the internal part is the argon chamber (11).

The first external polycarbonate sheet (20) and the second internal polycarbonate sheet (21) are laminated in their internal perimeter section (33) under vacuum; where the polycarbonate sheets (20) and (21) that form the internal wall of the argon chamber have a smaller perimeter between 1 and 3 cm than the perimeter of the glass sheets (16) and (1) that form the wall external of the argon chamber, forming the projection (24) of the flange (12) laminated with steel metal strip (13).

The manufacturing process of the antiballistic curved glass armor (10) with flange allows the following stages:

Cut glass sheet into a first external glass sheet (16) and a second internal glass sheet (17) or into more sections of external glass sheet (16) traced with the vehicle template to form an external section (30) of larger size of an anti-ballistic curved glass armor (10).

Polish and powder the external glass sheets (16) and internal glass sheets (17).

Bake at 630 degrees Celsius for curving.

Paint the external perimeter section (18).

Laminate these two or more glass sheets (16), (17) according to the level of protection required with ionoplast layer (28) in its external perimeter section (18).

Cover with a vacuum bag and insert into autoclave for lamination at 135 degrees Celsius.

Cool to room temperature between 8 degrees Celsius to 35 degrees Celsius and polish Cut polycarbonate into a first external polycarbonate sheet (20) and a second internal polycarbonate sheet (21) to form a smaller internal section (31) with a smaller perimeter between 1 and 3 cm than the perimeter of the glass sheets (16), (17), forming the projection (24).

Laminate between the first external polycarbonate sheet (20) and the second internal polycarbonate sheet (21) with a polyurethane layer (32) in between them, laminating the internal perimeter section (33), Cover with a vacuum bag and insert into autoclave for lamination at 125 degrees Celsius.

Join the laminated curved glass of the external glass sheet (16) and the internal glass sheet (17) with the external polycarbonate sheet (20) and the internal polycarbonate sheet (21) using double-sided tape (38) as a separator to form the argon chamber (11) leaving an upper flange (12) as an offset.

Seal the internal perimeter section (33) with urethane (23).

Drill a hole in the drilling region (37) and introduce argon.

Drill a hole in the perforation region (39) and expel air by suction from the argon chamber (11).

Protect the edge of the glass perimeter with metal strip (13) and adhesive (25).

Seal the entire internal perimeter section (33) and the external perimeter section (18) with urethane (23).

An invention is presented with a new way to solve the problem of known curves that protects from external impacts to prevent bullets from entering the interior of the vehicle, but at the same time allows internal impacts for 9 mm bullets to exit the vehicle to defend against external aggressor. In addition, the solution prevents the laminated layers from losing transparency and delamination because the lamination is carried out on the periphery and not on the entire surface. Finally, visibility in the windows is preserved despite changes in ambient temperature due to freezing, since the melting point of argon is −189.4° C. and this solution was not known to be incorporated in a steel armor. Anti-ballistic curved glass.

The invention claimed is:

1. A curved antiballistic glass armor comprising:

an external section having first and second glass sheets of equal size, the first and second glass sheets laminated with an ionoplast layer;

an internal section having first and second polycarbonate sheets of equal size, the first and second polycarbonate sheets laminated with a polyurethane layer;

wherein the internal section has a lateral dimension in a first direction less than a lateral dimension of the external section in the first direction, such that a portion of the external section extends beyond a periphery of the internal section and forms a flange;

wherein the external section is spaced from the internal section by a double-sided tape, the double-sided tape extending along a periphery of the internal section and partially defining an air chamber containing argon;

wherein the external section, the internal section, and the double-sided tape are joined and sealed with a urethane edge component extending along a periphery of the internal section; and the urethane edge component comprises two perforation regions, and the curved antiballistic glass armor has a maximum thickness of 15 mm.

2. The curved antiballistic glass armor according to claim 1, wherein the external section comprises an external perimeter section and the internal section comprises an internal perimeter section, wherein the external perimeter section and the internal perimeter section form a perimeter section including the first and second glass sheets and the first and second polycarbonate sheets.

3. The curved antiballistic glass armor according to claim 1, wherein the air chamber is formed between the second glass sheet of the external section and the first polycarbonate sheet of the internal section.

4. The curved antiballistic glass armor according to claim 1, wherein the first glass sheet has an internal face that is laminated with an external face of the ionoplast layer, and wherein the second glass sheet has an external face that is laminated with an internal face of the ionoplast layer.

5. The curved antiballistic glass armor according to claim 1, wherein the first polycarbonate sheet has an internal face that is laminated to an external face of the polyurethane layer, and wherein the second polycarbonate sheet has an external face that is laminated with an internal face of the polyurethane layer.

6. The curved antiballistic glass armor according to claim 1, wherein the curved antiballistic glass armor has a weight between 23 kg/m$^2$ and 24 kg/m$^2$ at NIJ level IIIA ballistic protection.

7. A process for manufacturing the curved antiballistic glass armor (10) of claim 1, comprising:

a) cutting sheet glass into a first glass sheet and a second glass sheet or more sections of glass sheet traced with the vehicle template to form an external section of the antiballistic curved glass armor;

b) polishing and powdering the first glass sheet and the second glass sheet;

c) baking at 630° C. for curving;

d) painting an external perimeter section of the external section;

e) laminating the first and second glass sheets according to a level of protection required with the ionoplast layer on the external perimeter section;

f) covering with a vacuum bag and inserting into an autoclave for lamination at 135° C.;

g) cooling to room temperature between 8 to 35° C. and polishing;

h) cutting polycarbonate into a first polycarbonate sheet and a second polycarbonate sheet to form the internal section with a smaller perimeter between 1 and 3 cm than the perimeter of the first and second glass sheets, forming the flange;

i) laminating the first polycarbonate sheet and the second polycarbonate sheet with the polyurethane layer in an internal perimeter section of the internal section;

j) covering with a vacuum bag and inserting into an autoclave for lamination at 125° C.;

k) joining the laminated external section and the internal section using the double-sided tape as a separator to form the air chamber leaving the flange as an offset;

l) Sealing the internal perimeter section with the urethane edge component;

m) drilling a hole in a first perforation region of the urethane edge component and introducing argon;

n) drilling a hole in a second perforation region of the urethane edge component and expelling air by suction from the air chamber;

o) protecting the edge of the glass perimeter with a metal strip and adhesive; and p) sealing the entire internal perimeter section and the external perimeter section with the urethane edge component.

* * * * *